INVENTORS
Eric V. Bergstrom and
Edward R. Sorf
BY Charles A. Huggett
ATTORNEY

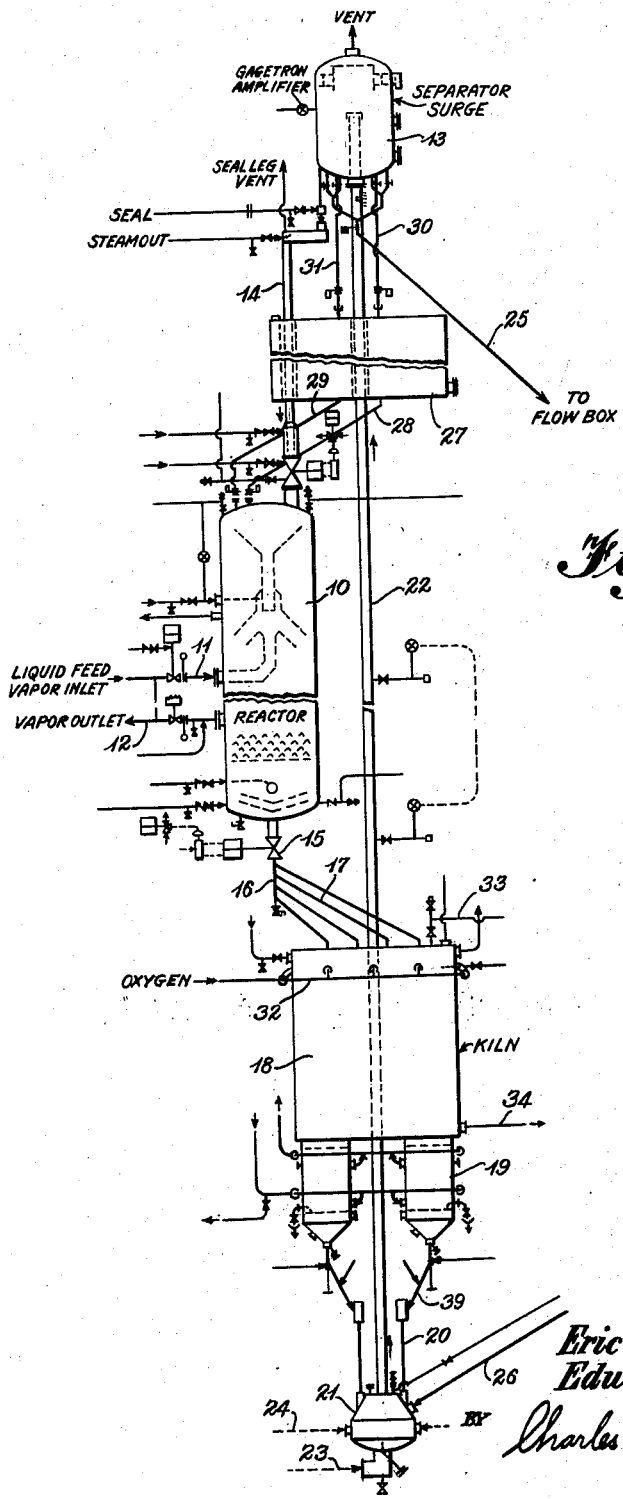

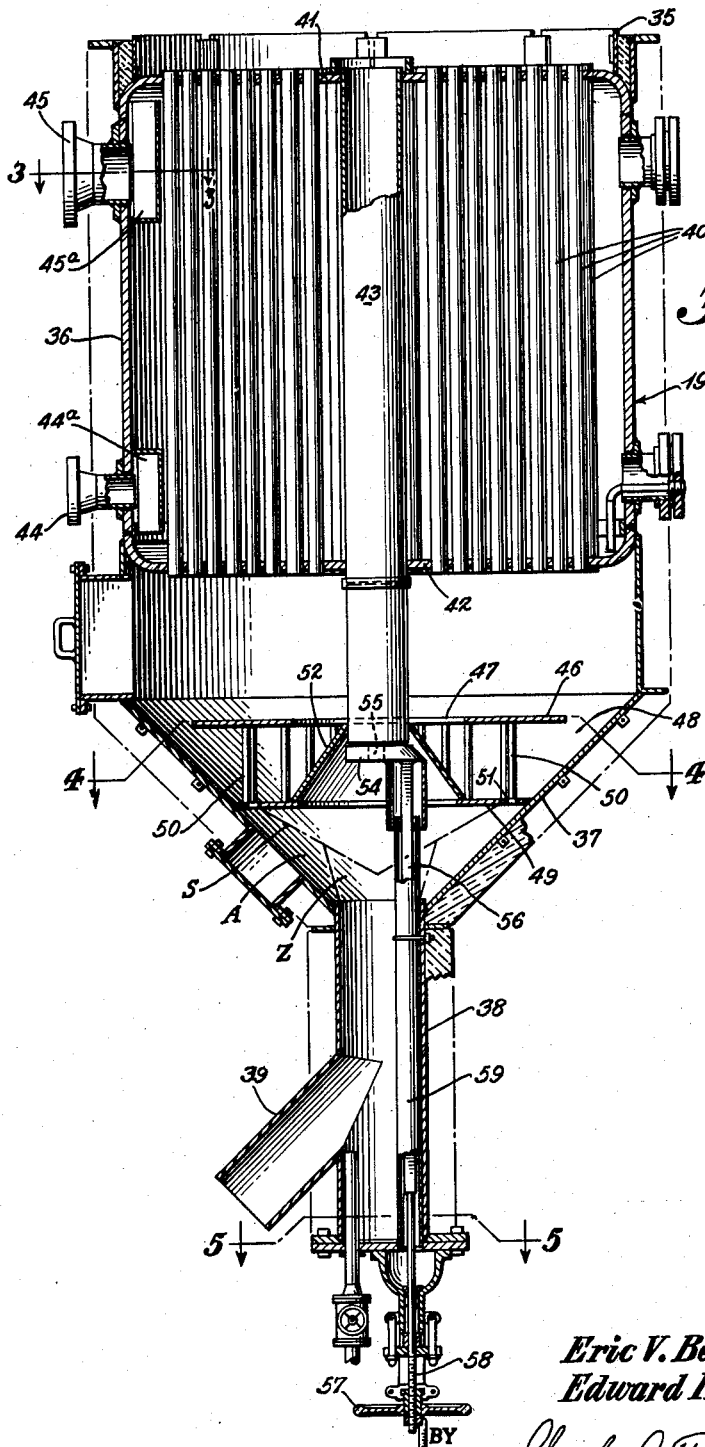

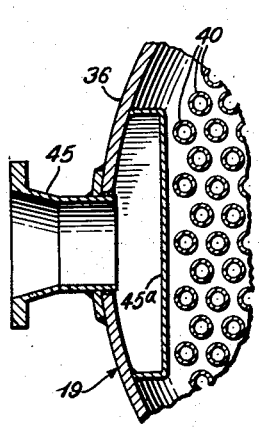
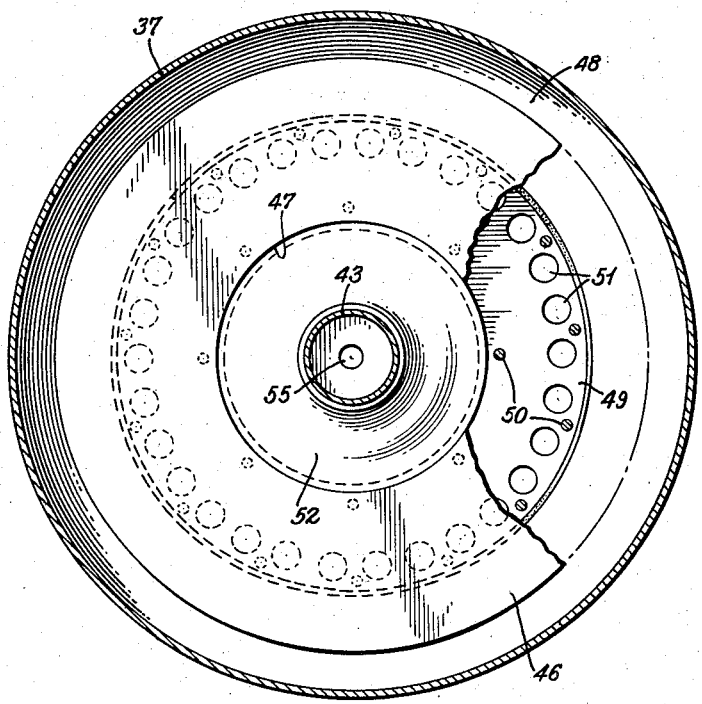
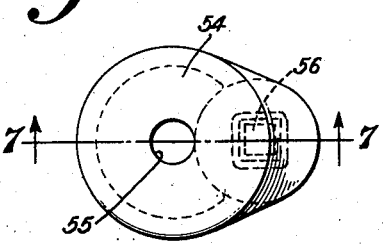
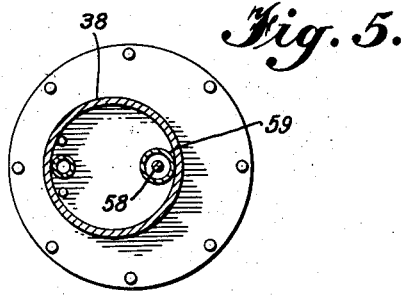
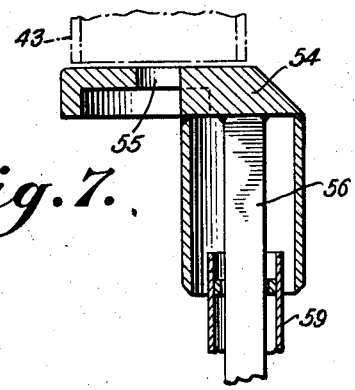

United States Patent Office 2,897,139
Patented July 28, 1959

2,897,139

TEMPERATURE CONTROL IN A MOVING BED SYSTEM EMPLOYED FOR HYDROCARBON CONVERSION

Eric V. Bergstrom, Short Hills, and Edward R. J. Sorf, Fanwood, N.J., assignors to Socony Mobil Oil Company, Inc., a corporation of New York Application January 14, 1955, Serial No. 481,802

5 Claims. (Cl. 208—165)

This application is directed to a process and apparatus for converting hydrocarbons in the presence of a particle-form solid contact mass. It has particular relation to a method and apparatus for adjusting the temperature of hot granular contact material in continuous moving bed conversion systems.

Various hydrocarbon conversion processes are known in which a hydrocarbon liquid or vapor is brought into contact with a comminuted solid material at a suitable, high temperature and for a sufficient period of time to provide a substantial conversion of the hydrocarbons into other more desirable hydrocarbons. In these conversion processes a carbonaceous deposit is formed on the solid contact material impairing the function of the contact material, making it essential that the deposit be removed therefrom. It is customary in these processes to regenerate or restore the contact material to its former condition by burning the carbonaceous deposit from the contact material.

In a preferred form of hydrocarbon conversion the solid contact material is continuously passed through a conversion zone as a substantially compact moving column of particle-form material. Hydrocarbons are admitted to the conversion zone and converted products removed therefrom continuously for long periods of time. The particle-form material is continuously withdrawn from the zone, contaminated with carbonaceous material. The contaminated material is then passed downwardly as a substantially compact column through a burning zone wherein the carbonaceous material is burned from the contact material, restoring the contact material substantially to its original state.

The burning of carbonaceous material on the solid contact material is highly exothermic. In many instances it is necessary to extract heat from the contact material before it can be transported through elevators which would be damaged by the excessive temperature of the material or before it can be supplied to the reaction vessel for further hydrocarbon conversion. The nature of the problems involved and the manner in which they are met by the present invention is well illustrated by apparatus for conversion of higher boiling hydrocarbons to ethylene by reaction for a very short time, say 0.2 second at high temperatures on the order of 1500° F. and above. To obtain the necessary short reaction time the high temperature reaction mixture must be promptly quenched to a low temperature. One advantageous system for accomplishing this high temperature short time reaction is to pass the charge hydrocarbons in direct contact with a bed of highly heated granular solid and then pass the hot reaction mixture through a bed of relatively cold granular solid. This requires two contacting chambers connected by a transfer line which will confine the hot gaseous mixture within a predetermined path. The hot contact material from the reaction chamber on which carbonaceous material is deposited during the conversion reaction is cooled from about 1000 to 1100° F. down to about 500 to 800° F., lifted by a suitable elevator to a heater, in which the carbonaceous material is burned from the material, and then readmitted to the reaction chamber as a downwardly moving column of contact material.

This problem is also illustrated by the adiabatic TCC process, in which solid contact material is passed downwardly as a substantially solid column through a reaction zone wherein it is contacted with hydrocarbons which are converted to suitable hydrocarbons in the gasoline range in substantial amounts and the contact material is then passed downwardly as a substantially solid column through a regeneration zone in which the contact material is contacted with a combustion supporting gas to burn off the carbonaceous deposits on the surface of the material. In the prior TCC processes, the regeneration, generally, provided sufficient heat to damage the catalyst, requiring the removal of heat from the kiln. This was accomplished by dividing the kiln into a series of burning and cooling zones. The temperature of the catalyst leaving each burning zone was controlled partly by the number of cooling coils in service in the following cooling zone. The cooling in the cooling zone was provided, generally, by one or more levels of horizontal, spaced tubes. Water was circulated through the number of tubes necessary to give the required cooling. Thus the effective heat transfer surface was varied by the number of tubes through which cooling water was circulated. In normal cracking operations, the reactor conditions vary frequently, which, in turn, causes variations in the amount of heat generated in the kiln and, therefore, the amount of heat which must be removed in the cooling zones. This requires cutting water flow in and out of some of the tubes. Since a tube which does not have water flowing through it may be at a temperature of about 1100° F., for example, while the water used for cooling may be only 200 to 400° F., severe stresses are set up in the tubes each time water is cut in or out. This caused frequent failure of the tubes, particularly at the location where they are sealed into the header.

In the recent adiabatic process the catalyst flow rate is increased substantially, approximately 2 or 3 times the old rate. Consequently, the carbon lay down on the catalyst during reaction is reduced because the catalyst is retained in the reactor a shorter period. The temperature reached in the regenerator, therefore, is maintained below the heat damaging level because there is a smaller per cent of carbon to be burned therein. The catalyst enters the kiln at approximately 850° F. and is withdrawn at approximately 1200° F., below the heat damaging temperature limit. No heat transfer tubes are needed in the kiln, permitting the kiln design to be exceedingly simple and easy to service. But, as previously indicated, generally, more heat is released in the kiln than is needed in the reactor, and, therefore, there is presented the problem of removing this excess heat from the system. A catalyst cooler of some sort must be included in the system, usually located subsequent to the kiln.

Prior art catalyst or pebble coolers are not found satisfactory for a variety of reasons. Inasmuch as more or less heat must be extracted from the catalyst from time to time, some means of control of the cooler characteristics is required. For example, many coolers allow the coolant to flow through exchanger tubes, being equipped with controls for preventing the flow of coolant through selected tubes. The empty tubes assume the temperature of the moving contact material. Consequently, when they are put back in service, the cold coolant fluid contacts the hot walls of the tube, causing the metal to spall and crack. This necessitates frequent cooler repair and replacement. Many of the prior coolers are disfavored because of their complexity, excessive cost or difficulty of control. Because of their tendency to develop leaks, the use of cooling fluids under pressure was largely precluded in their prior art coolers.

Moving bed catalyst systems of hydrocarbon conversion are effectively replacing fixed bed systems of operation. They have proved to be economical in the larger units of a size about 10,000 to 15,000 barrels per day. Usually, the kiln is divided into a series of stages with burning stages followed by cooling stages. Generally the cooling stage comprises one or more bundles of horizontal cooling pipes. In attempting to produce a smaller unit, handling about 2,000 to 3,000 barrels a day of charging stock, the cost of the kiln was found not to reduce in proportion to reduction in cost of the remaining equipment. By making the kiln without tubes, and providing a simple cooler adapted for use outside of the kiln, the unit has been found to provide an economically feasible moving bed system for the small refiner.

In Letters Patent 2,690,056 there is shown an indirect heat exchange type of cooler for use in receiving hot contact material issuing from a regenerator. In this cooler the temperature of the contact material is controlled by varying the volume of contact material which is brought into contact with the cooling surfaces. While this expedient is satisfactory, it has been found that the range of control which can be exercised thereby is limited and that beyond the satisfactory range the contact material is either non-uniformly or inadequately adjusted as to temperature.

It is an object of the present invention to provide for the uniform and adequate cooling of contact material through a wide range of temperatures and to improve upon the invention of Letters Patent 2,690,056.

A characteristic of the practice of the present invention is the high degree of uniformity of temperature throughout the bulk of contact material leaving the temperature adjusting zones and the ease and speed with which changes in the temperature of the contact material in the cooling zones may be made.

It is a specific object of the present invention to divide the contact material into separate streams during cooling, to cool the separate streams to different extents and to effect temperature control by predetermined mixing of the cooled streams with preferential introduction of the stream that is making the temperature adjustment.

It is proposed, according to the present invention, to provide in a hydrocarbon conversion system involving a continuous, compact catalyst bed gravitating through conversion and regeneration zones and the connections therebetween at a rate controlled by the rate of removal of contact material from the bottom of the system, a cooling zone in which the moving bed is subdivided into major and minor streams which are recombined with metered flow of the minor stream for temperature control purposes without interruption of the continuous compact column extending for the full height of the gravity flow zones of the system.

Other objects and advantages of this invention will be apparent from the following detailed description of several embodiments thereof in conjunction with the annexed drawings wherein:

Figure 1 is a schematic view in elevation of a hydrocarbon conversion plant incorporating the improvements of the present invention;

Figure 2 is a view in vertical section of a cooler constructed according to the principles of the present invention;

Figure 3 is a fragmentary view in transverse section taken on the line 3—3 of Figure 2;

Figure 4 is a view in transverse section taken on the line 4—4 of Figure 2;

Figure 5 is a view in transverse section taken on the line 5—5 of Figure 2;

Figure 6 is a plan view of the by pass flow regulator of the cooler of Figure 2;

Figure 7 is a fragmentary view in vertical section of the regulator of Figure 6;

Figure 8:
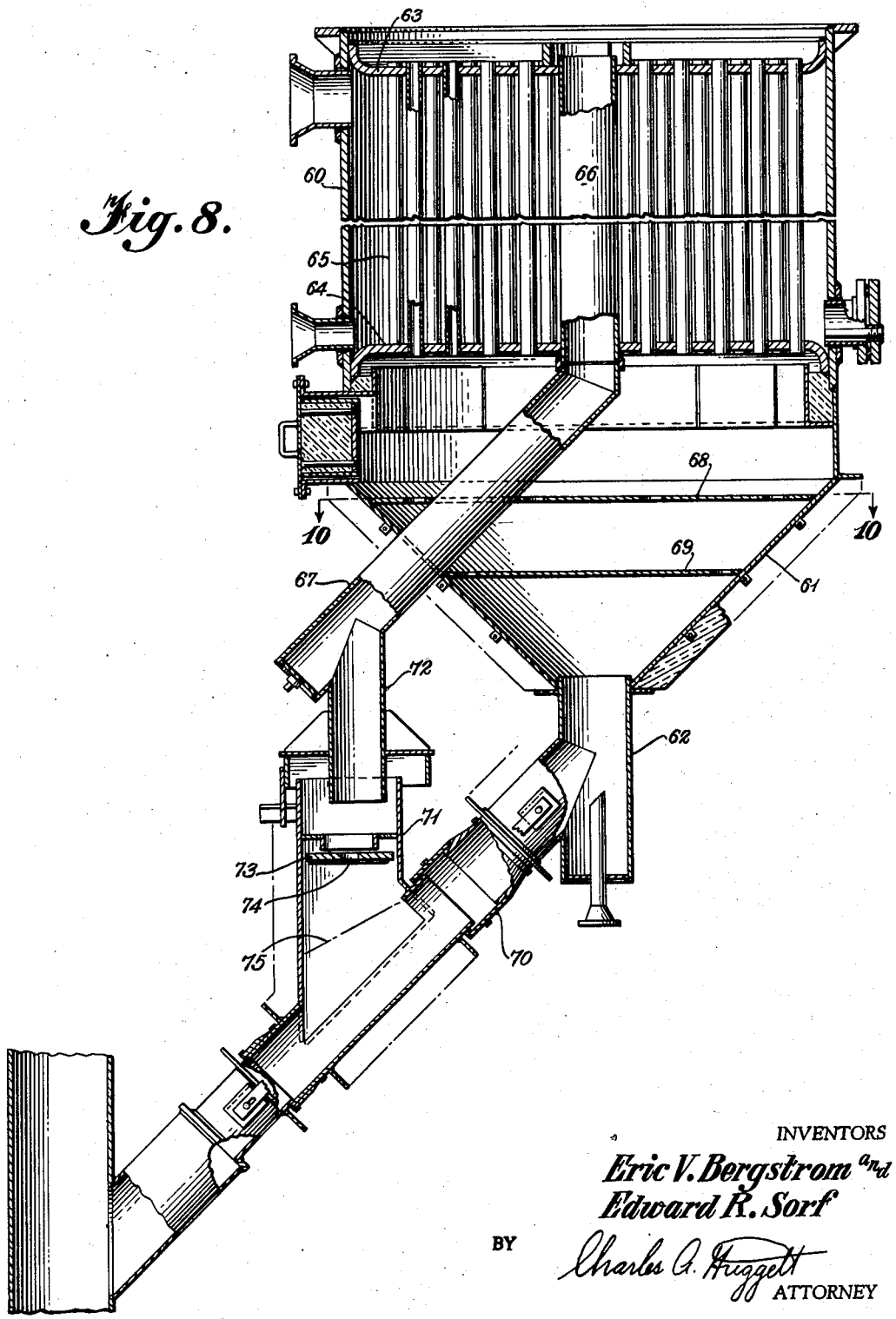
Figure 8 is a view in vertical section of another contact material cooler constructed according to the principles of the present invention.

In Figure 1 there is shown a portion of a TCC unit improved according to the present invention. Either liquid or vapor phase hydrocarbon material to be converted is supplied to a reactor 10 through inlet conduit 11 and the converted or cracked hydrocarbon products are withdrawn from the reactor 10 through conduit 12. Various other connections to and from the reactor are schematically shown in the interest of completeness but require no discussion for an understanding of this invention.

The reactor 10 is filled with a catalyst material of solid palpable, particle form and this material is a part of a compact moving bed that extends continuously from a separator 13 through a conduit 14, the reactor 10, a conduit 15, a manifold 16, four conduits 17, a kiln 18, coolers 19 and conduits 20 to a lift tank 21. The contact material entering lift tank 21 is pneumatically rasied in a conduit 22 to the separator 13.

Since the material gravitates as a continuous compacted column from separator 13 to lift tank 21, it is apparent that the contact material flow is the same throughout the gravity flow regions of the system and that the rate of this movement is a function of the rate of withdrawal of material from the lower ends of conduits 20. One important feature of this invention is to divide the continously moving bed in the coolers into a group of equal columns and at least one unequal column, separately to cool said group and said one unequal column and adjustably to recombine the columns without disturbing the continuity of the continuous vertical column of contact material gravitating at a rate which is a function of the rate of withdrawal from the bottom of the system.

While a valve is shown in the conduit 14 and another valve 15 is shown below the reactor 10, it is to be understood that these are safety valves for emergency use and that they are open during normal operation of the system.

The exact chemical nature of the conversion taking place in the reactor 10 is unimportant to an understanding of the present invention except that it is important to note that the catalytic conversion of hydrocarbons is usually an endothermic reaction in which the uniformity of application of heat affects both the size and purity of the yield. The required heat is usually supplied by the catalyst and, for that reason, both the temperature and the uniformity of that temperature throughout the body of material flowing to and across the cross section of the reactor is important. In cracking hydrocarbons the temperature in the reactor is usually 800–1000° F. This then is the desired temperature of the material flowing through the conduit 14 to the reactor 10 and uniformly present across the cross section of the reactor.

At the bottom of the gravity column of the TCC unit of Figure 1 primary and secondary gas under pressure are admitted to the lift tank 21 to lift the contact material up the conduit 22. To this end primary lift gas is introduced at 23 and secondary lift gas at 24. The gas so introduced into the system is removed in the separator 13 from which most of the contact material is returned to the reactor 10. Since, however, a system of the type shown requires a moving bed of palpable, particulate solid material and since there is some breakage or attrition of contact material in the course of its cyclic recirculation, a small percentage of the contact material reaching separator 13 is drained from the separator through a conduit 25 which leads to an elutriator, not shown, in which fines are separated. From the elutriator the contact material purged of fines is returned to the system through a conduit 26.

Since the attrition of the contact material is continuous and the removal of fines is continuous, there is provided a contact material make up box 27 leading through conduits 28 and 29 to the reactor 10. Additional contact material from this box can be made available as required. The contact material make up box 27 is connected by conduits 30 and 31 to the separator 13 so that material may be added to the make up box by supplying it to the lift tank 21 as by a connection, not shown, leading into the conduit 26.

It should be noted that the conduits 22 and 14 both of which carry hot contact material pass directly through make up box 27 and function to some extent in maintaining the proper temperature of the contact material in the box.

The kiln 18 is annular in cross section. The conduits 17 discharge at circumferentially spaced points about the annulus in order to distribute the contact material evenly throughout the kiln. The kiln 18 is supplied with oxygen through a manifold ring 32. The gases are withdrawn at 33 and 34. Note that conduit 22 passes upwardly through the central hole in the kiln 18 albeit so spaced as to be out of heat exchange relationship with the burning material in the kiln.

It is, of course, well known that the contact material contaminants which are removed in the kiln 18 are carbonaceous and that their removal by burning is a strongly exothermic reaction. In the case of catalysts contaminated by cracking hydrocarbons temperatures such as 1000°–1300° F. are reached in the regenerator. This is below the temperature at which catalyst damage occurs but above the temperature required in the reactor 10. The problem then is one of controlled cooling of the contact material to meet the conditions required in the reactor.

It is to be understood that this invention presupposes a temperature within the kiln 18 higher than any temperature required in the reactor 10 irrespective of such variables as differing charge stocks and different end product requirements. It is nevertheless apparent that since the cooler is a heat exchanger it could be used to add heat to contact material if that were necessary.

In order to cool a large volume of contact material to a particular temperature and in order to insure that the cooling is uniform throughout the body of contact material leaving the coolers, it has been found that the design of the cooler is most important. These coolers may be either single large capacity units or smaller units used in parallel. Four such coolers are employed in a system such as is shown in Figure 1. These coolers are capable of bringing about accurate temperature control which is uniform throughout the contact material that passes through them. It will be appreciated that while this uniformity of temperature is very important it is highly desirable to achieve it without disturbing the gravity flow rate of the contact material through the system. It will be appreciated that the conversion taking place in the reactor 10 is dependent upon a regular, uninterrupted, metered flow of contact material, as well as the maintenance of a uniform predetermined temperature therein.

The coolers 19 are shown only schematically in Figure 1, but one of them is shown in detail in Figures 2 to 7 inclusive, to which reference is now made. The top of the cooler shown in Figure 2 is provided with a short entrance duct 35 by which the material enters the vertically disposed, generally cylindrical housing 36. This housing includes a lower portion 37 in the form of an inverted frustrum of a cone. At the lower or apex end of the portion 37, a discharge duct 38 extends vertically downwardly and this duct has a branch conduit 39 therefrom which leads to the conduit 20 and from that to the lift mechanism.

In the upper or cylindrical portion of the cooler there are disposed a symmetrically arranged annular group of tubes 40 extending between upper tube sheet 41 and lower tube sheet 42, the tube sheets 41 and 42 being a part of or supported from the side walls of the cooler housing as a while. The tubes 40 are of equal length and internal and external dimensions and are carefully and uniformly distributed in an annular path in order that each shall present to the material flowing through it heat exchange characteristics which are the same as those of the others. Centrally located within the annular group of tubes 40 is a much larger tube 43 which is open at the top and which, likewise, receives contact material for flow therethrough.

In the zone between the tube sheets 41 and 42 there is circulated a coolant of such material, specific heat and temperature, as to bring about the desired adjustment in temperature of the contact material flowing through the tubes 40. Molten salts, such as potassium nitrite or nitrate may be used as the cooling fluid as well as metals, but liquid water maintained under pressure is preferred. For example, water pressures of 300 to 350 pounds per square inch gauge may be used with the boiling temperature being maintained by maintaining the water pressure at a fixed value. Whatever the coolant is, it is admitted through the side wall of the cooler 19 through an inlet fitting 44. It is circulated amongst the tubes 40 and 43 at a rate such that its heat adsorption characteristics remain substantially constant and it is withdrawn through outlet 45 near the top of the cooler 19. Baffles 44a and 45a merely assist in bringing about good coolant circulation.

It will be evident that because the pipes 40 are of the same length, thickness and material, the contact material flowing through them will be substantially equally cooled. On the other hand, the tube 43, being of much larger diameter, it is equally evident that the heat exchange effect will not be the same, so that material leaving the conduit 43 will be at a different and generally higher temperature than the material leaving the tubes 40. It is proposed as a part of this invention to return metered amounts of the material issuing from the pipe 43 for admixture with the main moving bed of material issuing from the pipes 40 in order that temperature control may be effected.

Below the lower ends of the tubes 40, there is located an annular baffle 46 having a central hole at 47 and defining with the sloping wall of the lower portion 37 of the cooler housing another annular space 48. The contact material issuing from the tubes 40 falls on this baffle and flows through the annular spaces 47 and 48 in a uniform manner onto a lower baffle 49, which is supported from the baffle 46 by connecting rods or standards 50. The baffle 49 is provided with a ring of circumferentially spaced apertures 51, which distribute the contact material uniformly near the apex end of the inverted frusto-conical lower portion 37 of the cooler 19.

At this point, it should be noted that the conduit or tube 43 extends through the central hole in the baffle 46 and that there depends from a point just above the lower end of the tube 43 a flared frusto-conical baffle 52. This baffle guides the contact material falling through the aperture 47 toward the ring of apertures 51 and creates a free space above the material lying in the apex or lower end of the portion 37 of the cooler. This free space is of great importance for the contact material flows through the entire cooler including the tubes 40 a continuous, compacted moving bed. This moving bed in the zone directly beneath the baffle 52 assumes a slope S which is a function of its angle of repose, see the line on the drawing. It will be appreciated that the particular angle which the material assumes will depend upon the particle shape and size and other criteria used in determining angles of repose. It will suffice to say, however, that a free space exists above the moving material. For particulate granular material of the type used in units disclosed in Figure 1, the angle of repose is 30 degrees. Bearing in mind that the material in the lower part 37 of the cooler is a part of a moving bed, is likewise germane to consider the angle of internal flow which exists in the funnel shaped region below the baffle 52. The angle of internal flow of the particular catalyst which has a 30 degree angle of repose is 75 degrees with the horizontal, this line is also designated in Figure 2. Thus in a funnel shaped moving bed there is a frusto conical central zone of movement Z bounded by a surface having a slope equal to the angle of internal flow of the contact material and a surrounding annular zone A which serves to feed the central zone which it surrounds. This means that the areas near the center of the sloping body of material marked Z in Figure 2 are moving preferentially to the material in the annular zone A around the central zone Z. The tube 43 discharges directly above the central zone Z which has just been described. It therefore follows that material will flow from zone A into zone Z to maintain the surface line S at the normal slope only to the extent that flow from the tube 43 fails to meet the demand. Thus any material from conduit 43 has a priority over material from zone A in entering conduit 38.

If reference is made to Figure 7, it can be seen that the lower end of the tube 43 is partially obturated by a valve 54 having therein a central aperture at 55. This valve 54 is shown in Figure 7 in its closed position, it is operated by raising and lowering it vertically whereby the flow of material issuing from the tube 43 may be metered from a minimum determined by the size of the aperture 55 to a maximum determined by the size of the tube 43 with the valve 54 at full open. Whatever amount of contact material issues from the tube 43, that material falls into the region Z of active movement of the contact material in the lower end of the cooler, whereby to be blended instantly into the bed of contact material flowing to the duct 38. It is to be emphasized that all of the material issuing from the tubes 40 has been subjected to the same cooling conditions and that the material issuing from tube 43 is blended in quickly to bring about a change which may be required. Because the material issuing from the tube 43 is somewhat hotter than the remaining material, control of temperature of the material in the ducts 38 and 39 can be adjusted by blending in more or less of the material issuing from the tube 43 by suitable operation of valve 54. It is likewise apparent that this material will mix well due to the admission of it to the zone of active flow. By introducing it to the zone of active flow, its temperature is instantly effective because of the co-mingling with the remainder of the moving bed.

Mechanically speaking, the valve 54 is operated by a screw lift. It has an operating rod 56, which is square in cross-section, and this operating rod is raised or lowered by turning an internally threaded hand wheel 57 which is in engagement with a threaded lower rod portion 58 of the rod 56, all as can be seen quite clearly in Figure 2. The operating rods 56 and 58 are housed in a tube 59 located within the duct 38. The duct 39 merely leads to the conduit 20, see Figure 1.

Figure 9:
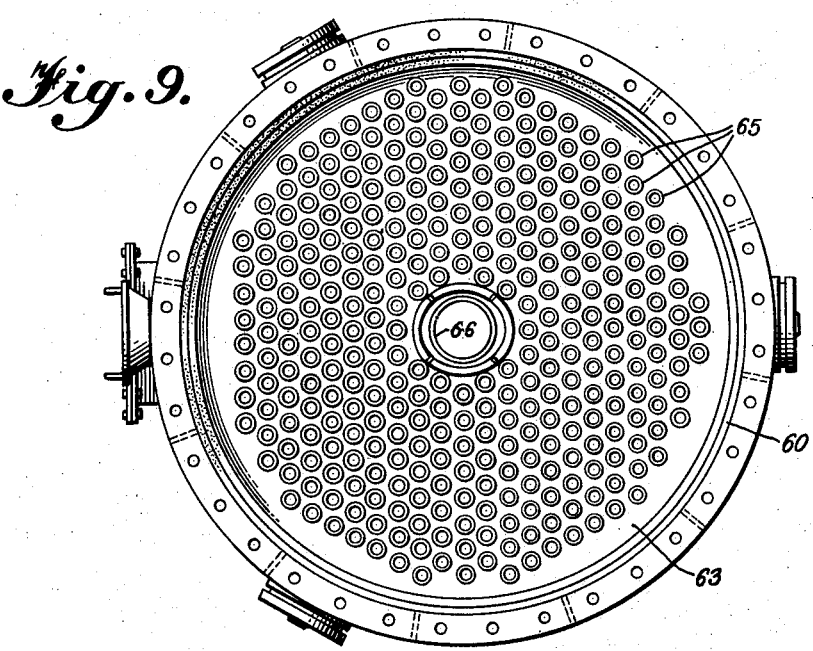
Figure 9 is a view in top plan of cooler of Figure 8.
Figure 10:
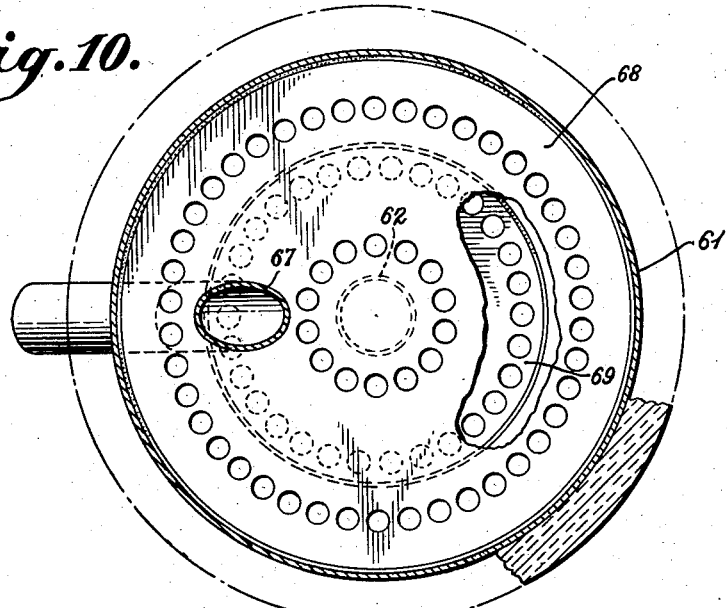
Figure 10 is a view in transverse section taken on the line 10—10 of Figure 8.

Referring now to Figures 8 to 10 inclusive, there is shown another type of cooler which may be used in an environment quite similar to that shown in Figure 1. In this case the basic difference is that the material which has been subjected to a different rate of heat exchange is blended with the main body of material externally of the cooler housing rather than internally thereof. The cooler assembly is shown in Figure 8. It comprises a generally cylindrical housing portion 60, terminating in a frusto-conical lower portion 61, the lower or apex end of which is provided with a short length of vertical outlet ducting 62. Within the housing 60 there are located a pair of tube sheets 63 and 64 between which extend a large number of symmetrically arranged annular group of contact material tubes 65. The pattern of these tubes can be well understood by reference to Figure 9, and while no view corresponding to Figure 9 was presented in connection with the Figure 2 assembly, the tube distribution of Figures 2 and 8 is quite similar. Centrally located in the annular group of tubes 65 there is located a large tube 66 corresponding in structure and in function to the tube 43. This tube, at its lower end, connects with a duct 67 which extends at about 45 degrees and leads the material out of the cooler housing.

The material issuing from the tube 65 flows through baffle plates 68 and 69, the holes of which are so distributed as to bring about a uniform distribution of the moving bed in the bottom of the chamber. The hole distribution and shape of the baffles 68 and 69 can be understood by reference to Figure 10. The main body of material issuing from the tubes 65 and passing through the plates 68 and 69 and into the outlet duct 62 is passed diagonally toward the lift through a ducting 70, which is provided with a vertically extending boss-like portion 71 into the mouth of which there extends a vertically depending discharge tube 72 leading from the lower end of the conduit 67. Disposed in the portion 71 there is a sliding type valve 73 provided with a plurality of apertures of varying size along its length, one of which is shown at 74. By sliding this valve 73 back and forth the amount of material that can flow through the valve is controlled and hence the amount of material issuing from the tube 66, which may be blended with the material flowing in the conduit 70 is under control.

An important feature of the portion of the invention shown in Figure 8 is the provision below the valve 73 of a free space above the line 75 determined by the angle of repose of the contact material being handled. It will be appreciated that material flows along the line 75 but that between that line and the diametrically opposite wall of the conduit 70, there is a zone of less flow activity. Accordingly, as was the case in Figure 2, the temperature control contact material issuing from the conduits 66, 67—72 falls into a surface at or in a zone of active flow, whereby to be well mixed and quickly mixed with the main moving bed of material flowing to the lift.

In both of Figures 2 and 8, it will be observed that the housing or shell of the cooler is provided with heat insulating material. The passage of the lift pipe 22 upwardly through the center of the kiln 18 is of advantage in mechanical lay-out. Suitable heavy insulation prevents the heat from the kiln from affecting the adjusted temperature of the contact material entering the lift.

What is claimed is:

1. Apparatus for cooling a particle form solid contact material which comprises a housing, a heat exchanger in said housing, said heat exchanger including a series of vertical tubes one of which is larger than the others, means to supply contact material to the tops of said tubes, means within said housing defining a space surrounding said tubes for the circulation therearound of a fluid heat exchange medium, conduit means for receiving contact material from said smaller tubes, said conduit means defining a particle-free space lying externally of said housing, a conduit extending from the bottom of said larger tube to said free space, a metering valve in said last-mentioned conduit whereby the amount of material from said large tube that may fall freely on the moving body of cooled contact material is controllable.

2. Apparatus for cooling a particle form solid contact material which comprises a heat exchanger including an annular group of vertical tubes of equal size and length, a larger tube centrally located within the annular group, means to supply contact material to the tops of said tubes, means defining a circulation space for a fluid heat exchange medium surrounding said tubes, means to meter the output from the central tube, conduit means receiving the contact material issuing from said group of tubes, said conduit means defining a particle-free space and means for directing the metered output of said central tube onto the surface of the moving bed of material in said free space.

3. In a hydrocarbon conversion system in which a granular contact material is passed cyclically as a compact mass through a reactor and regenerator and elevated to complete the cycle, the improved cooler for the hot contact material comprising in combination a heat exchanger providing a plurality of main vertical tubes of substantially equal and uniform cross-section, means for supplying contact material to the tops of all the tubes to keep the tubes filled with contact material at all times during operation of the cooler, at least one vertical control pipe of substantially greater cross-sectional area than the cross-sectional area of the main tubes, means for combining the contact material from the main tubes into a single gravitating compact stream, a discharge conduit attached to the bottom of said cooler disposed laterally but at a steep enough angle with the horizontal to maintain said conduit filled with contact material from the main tubes in compact flowing form, a chamber attached about said conduit, conduit means connecting the lower end of said control pipe with the upper portion of said chamber, means defining an aperture in the upper wall of said discharge conduit within said chamber, whereby a free surface of the gravitating contact material is formed within said chamber, mechanical metering means in said chamber above the free surface of the contact material adapted to maintain compact flow in the control pipe and arranged to drop contact material onto the free surface in free fall, means for adjusting said metering means to effect a change of flow of contact material through the control pipe, whereby the contact material passed through the control pipe is intimately and uniformly mixed with the contact material passed through the main tubes to provide a single gravitating compact stream of contact material of substantially uniform temperature.

4. In a moving bed conversion process in which a hot granular contact material is gravitated through a reaction zone and a regeneration zone as a compact mass in an enclosed cyclic system, the improved method of cooling the hot contact material comprising the steps of: passing the contact material through the cooling zone as a plurality of separated compact flowing main streams, maintaining the said main streams in indirect heat exchange relationship with a cooling liquid throughout the entire length of said main streams in said cooling zone, recombining the said main streams of contact material below the cooling zone into a single compact gravitating stream, whereby the flow rate of contact material through the separated main streams is determined solely by the flow rate of the single gravitating stream below the cooling zone, passing a portion of the contact material downwardly through the cooling zone through a limited number of control streams of substantially different cross-sectional area than the cross-sectional area of the main gravitating streams and as compact gravity flowing streams, maintaining said control streams in indirect heat exchange relationship with a cooling liquid throughout the entire length of the control streams in said cooling zone, metering the flow of the control streams below the cooling zone to thereby determine the ratio of flow of contact material between the main streams and the control streams, and recombining the control streams with the single compact gravitating stream of contact material below the cooling zone whereby temperature adjustment of the contact material is obtained while maintaining the number of main and control streams through the cooling zone constant and while maintaining each stream in indirect heat exchange relationship with a cooling liquid throughout the entire length of the stream in said cooling zone, the main gravitating streams of contact material being released from lateral confinement below the cooling zone to form a free surface of a contact material bed at the angle of repose of the contact material, the contact material passed through the control streams being metered above the level of the free surface so formed and being dropped in free fall onto this surface to combine with the contact material bed, and the contact material being withdrawn as a single stream below the surface of said bed a sufficient distance to effect uniform mixing of the contact material from the control streams with the contact material from the main streams, whereby a substantially uniform temperature is provided in the combined stream of contact material.

5. In a hydrocarbon conversion system in which a granular contact material is passed cyclically as a compact mass through a reactor and regenerator and elevated to complete the cycle, the improved cooler for the hot contact material comprising in combination a heat exchanger providing a plurality of main vertical tubes, of substantially equal and uniform cross-section, means for supplying contact material to the tops of all the tubes to keep the tubes filled with contact material at all times during operation of the cooler, at least one vertical control pipe of substantially different cross-sectional area than the cross-sectional area of the main vertical tubes, means for maintaining the exterior of the main tubes and control pipe in contact with a cooling liquid throughout substantially their entire length, contact material flow control means located at the lower ends of said control pipe adapted to provide adjustment of the ratio of flow rate of contact material through the control pipe to flow rate of contact material through the main tubes, whereby the desired temperature adjustment of the contact material is obtained, and means for recombining the contact material from the control and main streams into a single gravity flowing compact stream, baffle means located below the main tubes to divert contact material from the region directly beneath the control pipe, whereby a free contact material surface is formed under the control pipe at the angle of repose of the contact material, and means for withdrawing contact material from beneath the surface of the bed of contact material below the control pipe whereby intimate mixing of the main and control streams of contact material is afforded for the production of a single gravitating stream of contact material of substantially uniform temperature.

References Cited in the file of this patent

UNITED STATES PATENTS

| | | |
|---|---|---|
| 447,285 | Alberger | Mar. 3, 1891 |
| 2,291,637 | Kohlmann | July 28, 1941 |
| 2,363,874 | Krebs | Nov. 28, 1944 |
| 2,565,498 | Harkness | Aug. 28, 1951 |
| 2,670,933 | Bay | Mar. 2, 1954 |
| 2,690,056 | Bergstrom | Sept. 28, 1954 |
| 2,760,843 | Kollgaard | Aug. 28, 1956 |